United States Patent [19]
Morrow

[11] Patent Number: 5,824,984
[45] Date of Patent: Oct. 20, 1998

[54] PORTABLE ELECTRIC WIRE CUTTER

[76] Inventor: John A. Morrow, 1556 Hensley Rd., Fort Mill, S.C. 29715

[21] Appl. No.: 829,084

[22] Filed: Mar. 31, 1997

[51] Int. Cl.⁶ .................................................. B23K 11/22
[52] U.S. Cl. ............................................. 219/68; 140/139
[58] Field of Search .................................. 219/68, 69.12; 140/139; 83/16

[56] References Cited

U.S. PATENT DOCUMENTS

| | | | |
|---|---|---|---|
| 1,984,783 | 12/1934 | Burd | 219/68 |
| 2,667,557 | 1/1954 | Herzog | 219/68 |
| 2,706,231 | 4/1955 | Tyler | 219/68 |
| 3,107,287 | 10/1963 | Schechter . | |
| 3,297,886 | 1/1967 | Gershon | 219/233 |
| 3,354,478 | 11/1967 | Allen | 7/5.5 |
| 3,431,384 | 3/1969 | Cooper | 219/68 |
| 3,538,288 | 11/1970 | Freeman | 219/68 |
| 3,740,517 | 6/1973 | Lauer | 219/68 |
| 3,934,115 | 1/1976 | Peterson | 219/223 |
| 4,062,112 | 12/1977 | Lake | 30/228 |
| 4,528,435 | 7/1985 | Billon-Pierron et al. | 219/68 |
| 4,539,467 | 9/1985 | Wenger | 219/233 |
| 4,650,961 | 3/1987 | Nespor | 219/233 |
| 4,850,108 | 7/1989 | Perrino et al. | 30/90.4 |
| 4,929,810 | 5/1990 | Kawase | 140/139 |
| 5,036,588 | 8/1991 | Cherry | 30/180 |
| 5,308,114 | 5/1994 | Williams et al. | 280/762 |
| 5,438,758 | 8/1995 | Roth-White | 30/140 |
| 5,452,513 | 9/1995 | Zinnbauer et al. | 30/140 |
| 5,565,122 | 10/1996 | Zinnbauer et al. | 219/227 |
| 5,710,404 | 1/1998 | Descent | 219/68 |

*Primary Examiner*—Geoffrey S. Evans
*Attorney, Agent, or Firm*—Christopher John Rudy

[57] ABSTRACT

Portable electric wire cutter device includes a housing; a pair of spaced apart electrodes mounted with the housing; a source of electric current, for communication with the electrodes; a wire-guiding member, which can control or guide wire to be in proximity or contact with the electrodes; and a trigger mechanism, which can draw a wire within control of the wire-guiding member to electrical contact with the electrodes and activate a flow of electrical current from the source of electrical current to and from the electrodes, through a length of the wire in the electrical contact with the electrodes, such that the wire can be cut by the electrical current. The device may be of the hand-held type.

15 Claims, 1 Drawing Sheet

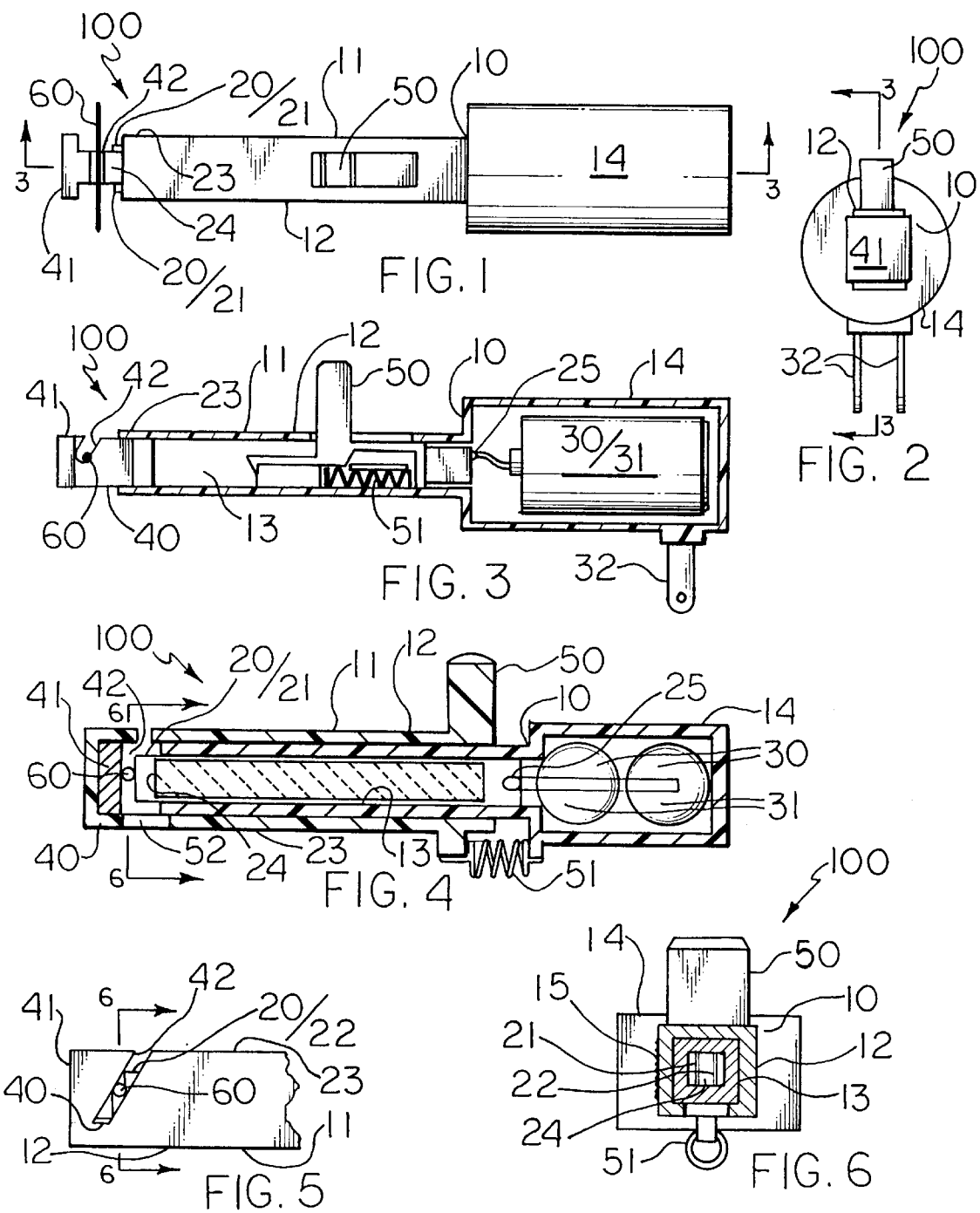

PORTABLE ELECTRIC WIRE CUTTER

BACKGROUND TO THE INVENTION

I. Field of the Invention

This invention concerns a device which can cut metal wire by use of electricity. The device can be of the hand-held type, which can be used about the home or in the field or shop.

II. The State of the Art, Its Problems, and Information Disclosed Pursuant to 37 C.F.R. 1.56; 1.97 and 1.98

The cutting of metal wires can present problems, especially when the wire is a hard wire or cable such as steel musical wire or steel strand cable. Conventional pliers and snips are simply, quite frequently not made to cut such hard wire readily, and also need room for the operator to manipulate and forcefully squeeze the instrument. In tight quarters, this can elevate the problem to an exasperating, if not impossible, level. Saws require that the wire be taught, and, as well, require room to maneuver. The cutting torch may be employed in certain limited situations, but the risk of fire and so forth limits its utility.

Williams et al., U.S. Pat. No. 5,308,114 (May 3, 1994), discloses a wire cutting device for land vehicles. In nature and gist, that invention is a wire cutter for electrically cutting a path through wires to allow a land vehicle (for example, a tank) to pass therethrough. The wire cutter does not use the forward motion of the vehicle to provide the actual cutting, and, in general, can cut any thickness of wire located in front of the vehicle. It includes first and second conductive rods mounted in spaced relationship and connected to voltages of different values, for example, to the positive and negative terminals of a power supply. A wire catcher device, comprising a pair of arms which are arranged in a U-shaped configuration and on which the rods are mounted, is provided for capturing wires located in the path of the vehicle and for guiding the wires so captured to the rods so as to complete an electrical circuit through the rods and thus provide melting of the wires so captured.

Allen, U.S. Pat. No. 3,354,478 (Nov. 28, 1967), discloses a wire cutting and connecting tool. In nature and gist, that invention is a wire cutting and connecting tool comprising a pair of relatively movable arm members carrying cooperating cutting and gripping jaws. One of the arm members is arranged to actuate an electrical switch when the gripping jaws firmly hold a member and a wire to be soldered thereto whereby electrical soldering current is then supplied to the gripping jaws. The tool is, however, constructed such that no electrical current is supplied to the cutting jaws when the latter cooperate to cut a wire.

Other devices are known. See generally, the following U.S. patents, any relevance of which is apparent through inspection:

U.S. Pat. No. 5,565,122 to Zinnbauer et al., for a Structure Cutting and Cauterizing Method Using Radiant Heat.

U.S. Pat. No. 5,452,513 to Zinnbauer et al., for a Structure Cutter.

U.S. Pat. No. 5,438,758 to Roth-White, for a Heated Knife.

U.S. Pat. No. 5,036,588 to Cherry, for a Nonvolatile, Fast Response Wire Cutter.

U.S. Pat. No. 4,850,108 to Perrino et al., for a Stripping Device.

U.S. Pat. No. 4,650,961 to Nespor, for a Battery Powered Thermal Wire Stripper.

U.S. Pat. No. 5,539,467 to Wenger, for an Electrically Heated Cutting Tool.

U.S. Pat. No. 4,062,112 to Lake, for an Explosively Operated Wire cutter.

U.S. Pat. No. 3,934,115 to Peterson, for a Method and Apparatus for Electric Singe Cutting.

U.S. Pat. No. 3,297,856 to Gershon for an Electrically Heated Tool for Cutting Plastics.

U.S. Pat. No. 3,107,287 to Schechter, for a Thermal Wire Stripper.

U.S. Pat. No. 1,984,783 to Burd, for an Electrically Serving Stranded Wire Structure.

U.S. Pat. No. 2,667,557 to Herzog, for a Wire Serving Apparatus.

U.S. Pat. No. 2,706,231 to Tyler et al., for an Apparatus for Producing Discontinuous Conductors.

U.S. Pat. No. 3,431,384 to Cooper, for a Means for Cutting Wire by Wire-melting Electrical Pulses.

U.S. Pat. No. 3,538,288 to Freeman, for Cable Serving by Electro-thermal Means.

U.S. Pat. No. 3,740,517 to Lauer, for an Electrical Wire Cutting Apparatus.

U.S. Pat. No. 4,528,435 to Billon-Pierron et al., for a Wire Cutting Process and Apparatus.

U.S. Pat. No. 4,929,810 to Kawase, for a Wire Cut Electric Discharge Machine.

U.S. Pat. No. 5,710,404 to Descent, for a Portable Handheld Device for Incinerating Needles.

SUMMARY OF THE INVENTION

The present invention provides a portable electric wire cutter device comprising a housing; a pair of spaced apart electrodes mounted with the housing; a source of electric current, for communication with the electrodes; a wire-guiding member, which can control or guide wire to be in proximity or contact with the electrodes; and a trigger mechanism, which can draw a wire within control of the wire-guiding member to electrical contact with the electrodes and activate a flow of electrical current from the source of electrical current to and from the electrodes, through a length of the wire in the electrical contact with the electrodes such that the wire can be cut by the electrical current. The device may be of the hand held type.

The invention is useful in cutting wire.

Significantly, by the invention, electrically conductive wire such as metal wire, and, most especially, hard wire such as music wire of steel, etc., can be cut very easily. The invention also is very effective on stranded cable such as brake and throttle cable of steel as it cuts and cauterizes the cable to keep it from fraying after the cut. It can require only a gentle trigger action for a very tough wire, and, since it cauterizes the tips of stranded wire, it makes unnecessary soldering of the tip of the cut cable. The device of the invention is advantageously embodied in a small housing suitable for highly efficient, hand held operation.

Numerous further advantages attend the invention.

DRAWINGS IN BRIEF

The drawings form part of the specification hereof. In the drawings, not necessarily drawn to scale, the following is noted:

FIG. 1 is a top view of an embodiment of a portable electric wire cutter of the present invention.

FIG. 2 is front view of the wire cutter of FIG. 2.

FIG. 3 is a view of the wire cutter of FIGS. 1 & 2, taken along 3—3.

FIG. 4 is a cut away, side plan view of another embodiment of a portable electric wire cutter of the present invention.

FIG. 5 is a side view of part of the wire cutter of FIG. 4, which provides detail of the wire slot in the outer sheath.

FIG. 6 is view of the wire cutter of FIG. 4, taken along 6—6.

ILLUSTRATIVE DETAIL

The invention can be further understood with the present detail, which may be considered with reference to the appended drawings. The same is to be taken in an illustrative, and not necessarily limiting, sense.

In reference to FIGS. 1–6, portable electric wire cutter device 100 includes housing 10, a pair of spaced apart electrodes 20; source of electric current 30; wire-guiding member 40, and trigger mechanism 50. By the device 100, which is of the hand held type, hard steel wire 60 can be cut by electrical current.

The housing 10 is of any suitable material as, for example, of a high temperature resistant, electrically insulating plastic or thermoset resin. The housing 10 includes elongate member 11, which can have outer sheath 12 that may be immovable (FIGS. 1–3) or movable such as by sliding movement (FIGS. 4–6) and inner member 13 that may be slidably movable (FIGS. 1–3) or immovable such as being in the form of inner sheath 13 (FIGS. 4–6). Base member 14, which may be provided in a shape conducive to holding by the hand, is present also, and the base member 14 generally is affixed to or integral with an immovable elongate member 11 part. A sandpaper or other abrasive supply 15 can be provided on an outside surface of the outer sheath 12 (FIG. 6).

The pair of spaced apart electrodes 20 is mounted with the housing 10 by suitable means. The electrodes 20, which can take the form of first blade 21 and second blade 22, for example, made of hard brass or of stainless steel, and which can be mounted about distal end 23 of the elongate member 11, can be separated by an insulating substance 24 to include air, but preferably, the insulating substance 24 is a solid material such as of ceramic. Thus, the insulating substance 24 can be electrically insulating. Internal electrical conduits 25 are present.

The source of electric current 30 is for communication with the electrodes 20, say, first blade 21 and second blade 22, for example, through the internal electrical conduits 25. The source of electric current 30 is a source of electric power, which can be obtained by any means, AC or DC, but the most convenient source is the use of high-current Nickel-Cadmium (NiCd) batteries 31, which make the system fully chargeable and portable, and the high-current NiCd batteries 31 can supply the amount of current needed in this small device 100. A version of the device could run through a cigarette lighting plug connected to the electrical system of a motor vehicle or by alligator clips to said vehicle battery. The batteries 31 could be charged by a wall charger, or the unit could have an integral charging circuit and plug 32 (FIGS. 2 & 3). The portable electric wire cutter could also be modified to run on 110-volt AC by replacing the batteries with a high-current transformer. In any event, electric power can be channeled through the two electrode blades 21 & 22 as appropriate.

The wire-guiding member 40 can control or guide the wire 60 so as to be in proximity or contact with the electrodes 20. The wire-guiding member 40 can take the form of nib 41, for example, of a ceramic material, which has reverse slanted slot 42 for the control or guiding of the wire 60 which can be placed therein.

The trigger mechanism 50 can draw a wire within control of the wire-guiding member 40 into electrical contact with the electrodes 20. Tension device 51, for example, a tension spring, can be provided so as to keep the wire-guiding member 40 in closed position unless it is being activated for insertion of the wire 60 for cutting. The spring also provides a constant and repeatable pressure to ensure proper electrical contact between the wire and electrodes. The trigger mechanism 50 and can activate a flow of electrical current from the source of electrical current 30 to and from the electrodes 20. The current flows through a length of the wire 60 in the electrical contact with the electrodes 20. Thereby, the wire 60 can be cut by the electrical current. Open bottom debris-cleaning aperture 52 (FIGS. 4–6) can be provided as well.

Operation of the device 100 is relatively straightforward. For example, in reference to the wire cutter device 100 depicted in FIGS. 1–3 or 4–6, the following general protocol is provided:

A) Holding the device about its housing base member 14, push trigger 50 forward with the thumb and insert a wire 60 into the slot 42.

B) Release the trigger 40, which forces the wire 60 into contact with the electrode blades 21 & 22, and count three seconds.

C) Push the trigger 60 again, and remove the wire 60, now cut into two pieces.

In addition, with reference to the wire cutter device 100 depicted in FIGS. 4–6, when the electrodes 20 become corroded, simply remove the spring 51, and then use the sandpaper 15 to clean the tips of the electrode blades 21 & 22.

The cutter 100 lends itself well to clamshell construction.

Various features, combinations and subcombinations of the invention can be practiced without reference to other features, combinations and subcombinations. These are contemplated to be within the practice of the invention.

CONCLUSION

The present invention is thus provided. Numerous modifications can be effected within its spirit, the literal claim scope of which is particularly pointed out as follows:

I claim:

1. A portable electric wire cutter device comprising a housing; a pair of spaced apart electrodes mounted with the housing; a source of electric current, for communication with the electrodes; a wire-guiding member, which can control or guide wire to be in proximity or contact with the electrodes; and a trigger mechanism, which can draw a wire within control of the wire-guiding member to electrical contact with the electrodes and activate a flow of electrical current from the source of electrical current to and from the electrodes, through a length of the wire in the electrical contact with the electrodes such that the wire can be cut by the electrical current.

2. The device of claim 1, which is sized to be hand held.

3. The device of claim 2, wherein the housing includes an elongate member, which has an outer sheath, an inner member, and a base member, which generally is affixed to or integral with an immovable elongate member part; the pair of spaced apart electrodes takes the form of a first blade and a second blade, which are mounted about a distal end of the elongate member and which are separated by an electrically insulating substance, and internal electrical conduits in electrical communication with the first and second blades are present; the wire-guiding member takes a form of a nib, which has a reverse slanted slot for control or guiding of the wire which can be placed therein; and the trigger mechanism includes a tension device so as to keep the wire-guiding member in closed position unless it is being activated for insertion of the wire for cutting and to supply constant pressure for proper electrical contact between the wire and said electrodes.

4. The device of claim 3, wherein the insulating substance is a solid material.

5. The device of claim 4, wherein the outer sheath is immovable and the inner member is slidably movable.

6. The device of claim 5, which has an integral charging circuit and plug.

7. The device of claim 5, wherein the source of electric current includes high current NiCd batteries.

8. The device of claim 7, wherein the nib is a ceramic.

9. The device of claim 5, wherein the source of electric current includes a high current AC transformer.

10. The device of claim 5, wherein the source of electric current includes connection to a cigarette lighting plug on a motor vehicle.

11. The device of claim 5, wherein the source of electric current includes connection by alligator clips to a motor vehicle battery.

12. The device of claim 4, wherein the outer sheath is slidably movable and the inner member is immovable.

13. The device of claim 12, wherein the source of electric current includes high current NiCd batteries.

14. The device of claim 13, wherein the nib is a ceramic.

15. The device of claim 13, wherein an open debris-cleaning aperture is provided below the electrodes.

* * * * *